(12) United States Patent
Lee et al.

(10) Patent No.: US 12,408,802 B2
(45) Date of Patent: Sep. 9, 2025

(54) ROBOT CLEANER

(71) Applicant: LG ELECTRONICS INC., Seoul (KR)

(72) Inventors: Seungjin Lee, Seoul (KR); Sangik Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 351 days.

(21) Appl. No.: 18/017,338

(22) PCT Filed: Dec. 9, 2020

(86) PCT No.: PCT/KR2020/017952
§ 371 (c)(1),
(2) Date: Jan. 20, 2023

(87) PCT Pub. No.: WO2022/019405
PCT Pub. Date: Jan. 27, 2022

(65) Prior Publication Data
US 2023/0320547 A1 Oct. 12, 2023

(30) Foreign Application Priority Data
Jul. 22, 2020 (KR) .................. 10-2020-0090970

(51) Int. Cl.
*A47L 9/00* (2006.01)
*A47L 9/28* (2006.01)
(Continued)

(52) U.S. Cl.
CPC ............. *A47L 9/009* (2013.01); *A47L 9/2852* (2013.01); *B60B 19/00* (2013.01); *B60K 7/0007* (2013.01);
(Continued)

(58) Field of Classification Search
CPC .... A47L 9/009; A47L 9/2852; A47L 2201/04; B60B 19/00; Y10S 901/01
See application file for complete search history.

(56) References Cited

U.S. PATENT DOCUMENTS 6,176,284 B1 * 1/2001 Takada .................. B60C 11/047
152/902
6,633,150 B1 * 10/2003 Wallach .................. A47L 9/009
15/53.4
(Continued)

FOREIGN PATENT DOCUMENTS

JP 5-91910 U 12/1993
KR 10-2005-0122118 A 12/2005
(Continued)

*Primary Examiner* — Steve Clemmons
(74) *Attorney, Agent, or Firm* — Birch, Stewart, Kolasch & Birch, LLP (57) ABSTRACT

Disclosed is a robot cleaner including a main body for forming an exterior of the robot cleaner, each wheel cover detachably disposed in the main body, each driving module movably coupled to each wheel cover, and each wheel coupled to each driving module and rotated by receiving a driving force from each driving module, wherein each wheel includes a wheel body coupled to each driving module and forming an appearance of each wheel, a plurality of treads arranged to be spaced apart from each other along a circumferential face of the wheel body, and a plurality of ribs respectively disposed between the treads and protruding radially outward of each wheel.

14 Claims, 10 Drawing Sheets

(51) Int. Cl.
*B60B 19/00* (2006.01)
*B60C 11/13* (2006.01)
*B60K 7/00* (2006.01)

(52) U.S. Cl.
CPC ....... *A47L 2201/04* (2013.01); *B60B 2200/49* (2013.01); *B60C 2011/1361* (2013.01); *B60K 2007/0092* (2013.01)

(56) References Cited

U.S. PATENT DOCUMENTS

| | | | |
|---|---|---|---|
| 8,733,796 B2* | 5/2014 | Lee | B60B 19/12 |
| | | | 280/856 |
| 9,597,930 B2* | 3/2017 | Dautrey | B60C 19/002 |
| 2006/0260087 A1* | 11/2006 | Im | A47L 9/009 |
| | | | 15/319 |
| 2017/0209015 A1 | 7/2017 | Liu et al. | |
| 2018/0184875 A1* | 7/2018 | Youk | A47L 9/28 |

FOREIGN PATENT DOCUMENTS

| | | | |
|---|---|---|---|
| KR | 10-0613809 B1 | | 8/2006 |
| KR | 10-0619786 B1 | | 9/2006 |
| KR | 20090007907 A | * | 1/2009 |
| KR | 10-2009-0013349 A | | 2/2009 |
| KR | 20090013349 A | * | 2/2009 |
| KR | 10-1480639 B1 | | 1/2015 |
| KR | 10-2016-0104056 A | | 9/2016 |
| KR | 10-2018-0079068 A | | 7/2018 |
| KR | 10-2019-0021294 A | | 3/2019 |
| TW | I582322 B | | 5/2017 |
| TW | I664943 B | | 7/2019 |

* cited by examiner

ROBOT CLEANER

CROSS REFERENCE TO RELATED APPLICATIONS

This application is the National Phase of PCT International Application No. PCT/KR2020/017952, filed on Dec. 9, 2020, which claims priority under 35 U.S.C. 119(a) to Patent Application No. 10-2020-0090970, filed in the Republic of Korea on Jul. 22, 2020, all of which are hereby expressly incorporated by reference into the present application.

TECHNICAL FIELD

The present disclosure relates to a robot cleaner.

BACKGROUND ART

A person cleans a living space thereof for hygiene and cleanliness. There are many reasons for the cleaning. For example, the cleaning may be done to protect a body from disease or to prevent damage to a bronchus. Further, the cleaning may be done for a quality of life, such as, for using the space thereof in a clean state.

Dust or foreign substances settle on a floor by gravity. Thus, in order to perform the cleaning, people tend to bend their waists or sit down, so that it is easy to put a strain on the waists or joints.

To this end, in recent years, cleaners that help people clean have appeared. The cleaners may be roughly classified into a handy stick cleaner, a bar-type cleaner, a robot cleaner, and the like.

Among these, the robot cleaner cleans the space instead of a user in a specific space such as a home, an office, or the like. The robot cleaner generally performs the cleaning by sucking dust in a region to be cleaned.

A tread pattern may be formed on a wheel of the robot cleaner for stable travel. However, in the region to be cleaned of homes, offices, or the like where the robot cleaner travels, there may be cases in which electric wires for use of home appliances or foreign substances having a large particle diameter are caught between the tread patterns, which may hinder the stable travel.

In particular, Patent Document 1 and Patent Document 2 disclose that each rib is formed between two adjacent tire tread patterns. However, Patent Document 1 is a document on an automobile tire, which has a difference in application range from the tire of the robot cleaner.

Patent Document 3 discloses a driver module that is detachable and is able to alleviate a shock against a floor face, but does not disclose contents for the stable travel because it is not easy to remove the foreign substance when the foreign substance is caught between the treads.

PATENT DOCUMENTS

Patent Document 1: Korean Patent Application Publication No. 10-2013-0117131 (2015.01.02)

Patent Document 2: Korean Patent Application Publication No. 10-2016-7020870 (2016.09.02)

Patent Document 3: Korean Patent Application Publication No. 10-2019-0021294 (2019.03.05)

DISCLOSURE

Technical Problem

The embodiments of the present disclosure are to provide a robot cleaner that may effectively prevent a foreign substance from being caught in a wheel.

In addition, the embodiments of the present disclosure are to provide a robot cleaner that may prevent a foreign substance from being caught and effectively secure a climbing performance at the same time.

Technical Solution

An embodiment of the present disclosure provides a robot cleaner that has changed a shape of treads formed on a wheel of the robot cleaner.

Specifically, provided is a robot cleaner that may prevent degradation of a climbing performance that occurs when preventing a foreign substance from being caught between treads.

In particular, provided is a robot cleaner that may easily climb a stepped terrain, such as a threshold, as a thin rib is bent.

More specifically, a robot cleaner according to an embodiment of the present disclosure includes a main body, each wheel cover, each driving module, and each wheel. The main body forms an appearance of the robot cleaner, and each wheel cover is detachably disposed in the main body.

Each driving module is movably coupled to each wheel cover, and each wheel is coupled to each driving module and is rotated by receiving a driving force from each driving module.

Each wheel includes a wheel body, a plurality of treads, and a plurality of ribs. Each wheel body is coupled to each driving module and forms an appearance of each wheel. The plurality of treads are arranged to be spaced apart from each other along a circumferential face of the wheel body. The plurality of ribs are respectively disposed between the treads and protrude radially outward of each wheel.

The rib may protrude to have the same height as the tread. The rib may protrude to have a smaller height than the tread.

The rib may have a smaller thickness than the tread. Each tread may be formed such that a center thereof has a greater thickness than both ends thereof in a width direction of the wheel body.

Each tread may have a contact face in contact with a road face in an octagonal shape. The rib may have a smaller width than the tread.

The rib may be made of the same material as the tread. The rib may be made of a material different from a material of the tread.

The plurality of ribs may be arranged in the rest except for some of a plurality of spaced spaces, and each spaced space may be defined between every adjacent two of the plurality of treads. The rib may have elasticity to be bent by being pressed by the ground.

Each driving module may be disposed in each wheel cover to be movable in a vertical direction, and the rib may be constructed to have a height allowing the rib not to be in contact with each wheel cover in a state where each driving module is maximally in close contact with each wheel cover.

Each wheel may include a plurality of bents defined by being recessed inward of each wheel body between the treads, and each rib may be disposed to protrude from each bent radially outward of the wheel body.

Each rib may include a central portion and wing portions positioned on both sides of the central portion based on a width direction of the wheel body. The wing portion may be thicker than the central portion.

Advantageous Effects

The embodiments of the present disclosure may provide the robot cleaner that may travel stably without being disturbed by the foreign substance such as the electric wire.

In addition, the embodiments of the present disclosure may provide the robot cleaner that may effectively perform cleaning because the climbing performance is not degraded even when a member capable of preventing the foreign substance from being caught between the treads is formed.

In addition, the embodiments of the present disclosure may provide the robot cleaner that may prevent the foreign substance from being caught, so that the user does not need to constantly supervise a travel situation of the robot cleaner to determine whether a malfunction resulted from the foreign substance has occurred, thereby maximizing convenience of a user.

BEST MODE

Hereinafter, an embodiment of the present disclosure will be described in detail with reference to the accompanying drawings such that a person having ordinary knowledge in the technical field to which the present disclosure belongs may easily implement the embodiment.

However, the present disclosure is able to be implemented in various different forms and is not limited to the embodiment described herein. In addition, in order to clearly describe the present disclosure, components irrelevant to the description are omitted in the drawings. Further, similar reference numerals are assigned to similar components throughout the specification.

Duplicate descriptions of the same components are omitted herein.

In addition, it will be understood that when a component is referred to as being 'connected to' or 'coupled to' another component herein, it may be directly connected to or coupled to the other component, or one or more intervening components may be present. On the other hand, it will be understood that when a component is referred to as being 'directly connected to' or 'directly coupled to' another component herein, there are no other intervening components.

The terminology used in the detailed description is for the purpose of describing the embodiments of the present disclosure only and is not intended to be limiting of the present disclosure.

As used herein, the singular forms 'a' and 'an' are intended to include the plural forms as well, unless the context clearly indicates otherwise.

It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in this specification, the term 'and/or' includes a combination of a plurality of listed items or any of the plurality of listed items. In the present specification, 'A or B' may include 'A', 'B', or 'both A and B'.

Figure 1:
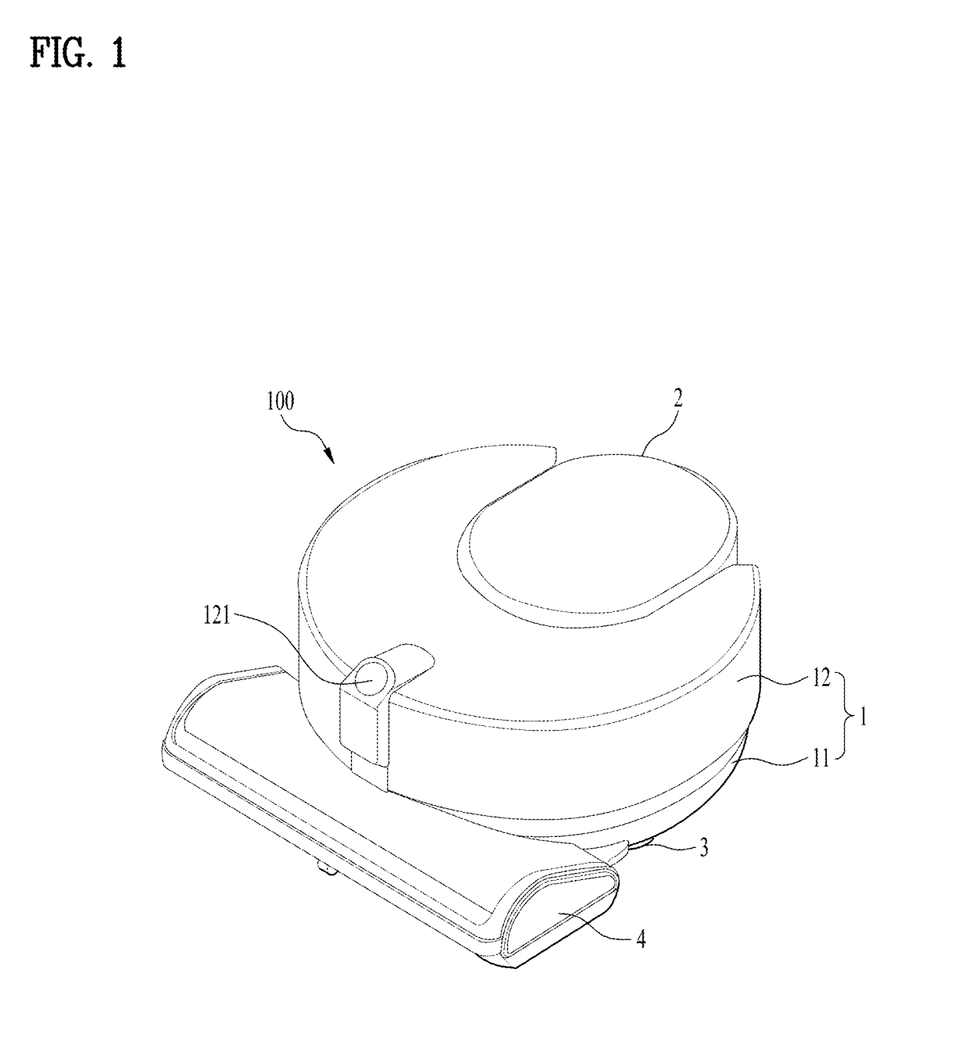
FIG. 1 is a perspective view of a robot cleaner according to an embodiment.

FIG. 1 is a perspective view of a robot cleaner according to an embodiment.

A robot cleaner 100 according to an embodiment may include a main body 1, a dust collector 2, and drivers 3. Further, the robot cleaner 100 may further include a battery (not shown) for providing electric power such that the above-described driver and dust collector may be electrically driven.

The battery may be provided as a secondary battery and may be repeatedly charged and discharged. Thus, a user may use the robot cleaner by repeatedly charging the battery when a battery power level is low without having to replace or add a battery.

When the battery is provided as the secondary battery, the robot cleaner may further include a charging device (not shown) that may charge the robot cleaner.

In another example, the battery may be provided as a dry battery rather than the secondary battery. In this case, the dry battery may be required to be replaced when the dry battery is dead.

That is, there is no restriction on how the robot cleaner is provided with the electric power.

The main body 1 may be disposed to form an appearance of the robot cleaner 100.

The main body 1 may include a first housing 11 and a second housing 12.

The first housing 11 may form a portion of the main body 1 and may provide a space in which electronic components required for the robot cleaner 100 or parts required for the robot cleaner are mounted.

For example, a controller (not shown) that controls an operation of the robot cleaner 100 may be mounted.

Further, the first housing 11 may be disposed to provide a flow path (not shown) through which air containing dust is guided to the dust collector 2 to be described later. That is, the air sucked through a suction portion 4 to be described later may be guided through an internal space of the first housing 11 to the dust collector 2.

The second housing 12 may be disposed in a form of a cover that covers the first housing 11. However, the second housing 12 is not limited thereto.

A display (not shown) may be disposed on one face of the second housing 12. The display may be formed in a shape of a touch panel, so that the user may simply enter a command through the display.

It is sufficient that the second housing 12 is disposed to be coupled to the first housing 11. For example, the second housing 12 may be hinged or integrally formed with the first housing 11.

However, it is preferable that the second housing 12 is separately disposed in consideration of installation convenience of the parts mounted in the first housing 11. The second housing 12 may prevent the parts mounted in the first housing 11 from being contaminated or damaged by an outside factor.

That is, the robot cleaner according to the present embodiment may be disposed such that the parts mounted in the first housing 11 are covered by the second housing 12 and not exposed to the outside. Thus, when the parts are operating, a user's body may be injured due to user's carelessness, malfunction, or the like. Thus, the main body 1 may cover the internal parts to prevent a safety accident. Further, because the main body 1 is present, a complex interior is not exposed to the outside, thereby creating a sense of beauty. Thus, the main body 1 may be used as a design element.

The sensor unit 121 may be disposed on the main body 1. The sensor unit 11 may provide image information such that the robot cleaner 100 may travel in a region to be cleaned. The sensor unit 121 may be a camera or a photographing sensor.

Specifically, the sensor unit 121 may collect information necessary for autonomous travel of the robot cleaner 100.

For example, the sensor unit 121 may include the photographing sensor that creates a travel map by photographing a periphery of the robot cleaner 100, an obstacle sensor that senses an obstacle, and the like. In another example, additional sensors may be further arranged in addition to the above-described sensors.

For example, the sensor unit 121 may further include a wall sensor (not shown). Thus, information about the region to be cleaned may be input to the robot cleaner 100 through the wall sensor, the photographing sensor, and the like. The robot cleaner 100 may input a shape of a space while traveling, and divide the region to be cleaned through the wall sensor into a plurality of cleaning areas.

The dust collector 2 may be a portion where the dust is collected. The dust collector 2 may include a cyclone (not shown). The dust collector 2 may be in communication with the suction portion 4.

The air may be introduced into the robot cleaner by the dust collector 2. When the air is sucked by the dust collector 2 and the air from which the dust has been removed is discharged to the outside, a negative pressure is generated in the robot cleaner 100, so that the air containing the dust may be introduced through the suction portion housing 41.

The dust collector 2 may be formed in a form in which relatively large dust is primarily separated and then relatively small dust is secondarily separated. However, the dust collector 2 is not limited thereto and is sufficient when being able to suck the dust present on the traveling face.

The dust collector 2 may be disposed to be detachable from the main body 1. Thus, when the robot cleaner completes the cleaning or when excessive dust is accumulated in the dust collector 2, the user may easily separate the dust collector 2 to remove the dust, thereby ensuring convenience.

The suction portion 4 may be a portion that is coupled to the main body of the robot cleaner 100 to perform the cleaning.

The suction portion 4 may include a suction portion housing 41 and a roller 42.

The suction portion 4 may be disposed to clean a traveling face. Specifically, the suction portion 4 may be disposed to suck dust present on the traveling face.

The traveling face may be a floor face. When a carpet or the like is disposed, the traveling face may be a top face of the carpet.

The dust may be sucked into a space provided by the first housing 11 through the suction portion housing 41. The sucked dust may be collected in the dust collector 2 and air from which the dust has been removed may be discharged to the outside of the main body 1.

The suction portion housing 41 may be disposed to be coupled to the main body 10 to provide a space for accommodating a mop 50 to be described later therein.

Further, the suction portion housing 41 may provide a flow path through which the air containing the dust may be sucked such that the dust present on the traveling face may be removed.

Specifically, the suction portion housing 41 may provide the space for accommodating the roller 42 therein as described above, so that the roller 42 may smoothly clean the traveling face.

There is no restriction on a connection relationship between the suction portion housing 41 and the main body 1. That is, the suction portion housing 41 and the main body 1 may be integrally formed or may be formed separately. However, it is preferable that the main body 1 and the suction portion housing 41 are separately formed from a viewpoint of convenience when cleaning an interior of the roller or when a failure of a component occurs in the suction portion housing 41 or in the main body 1 and the component is replaced.

Figure 2:
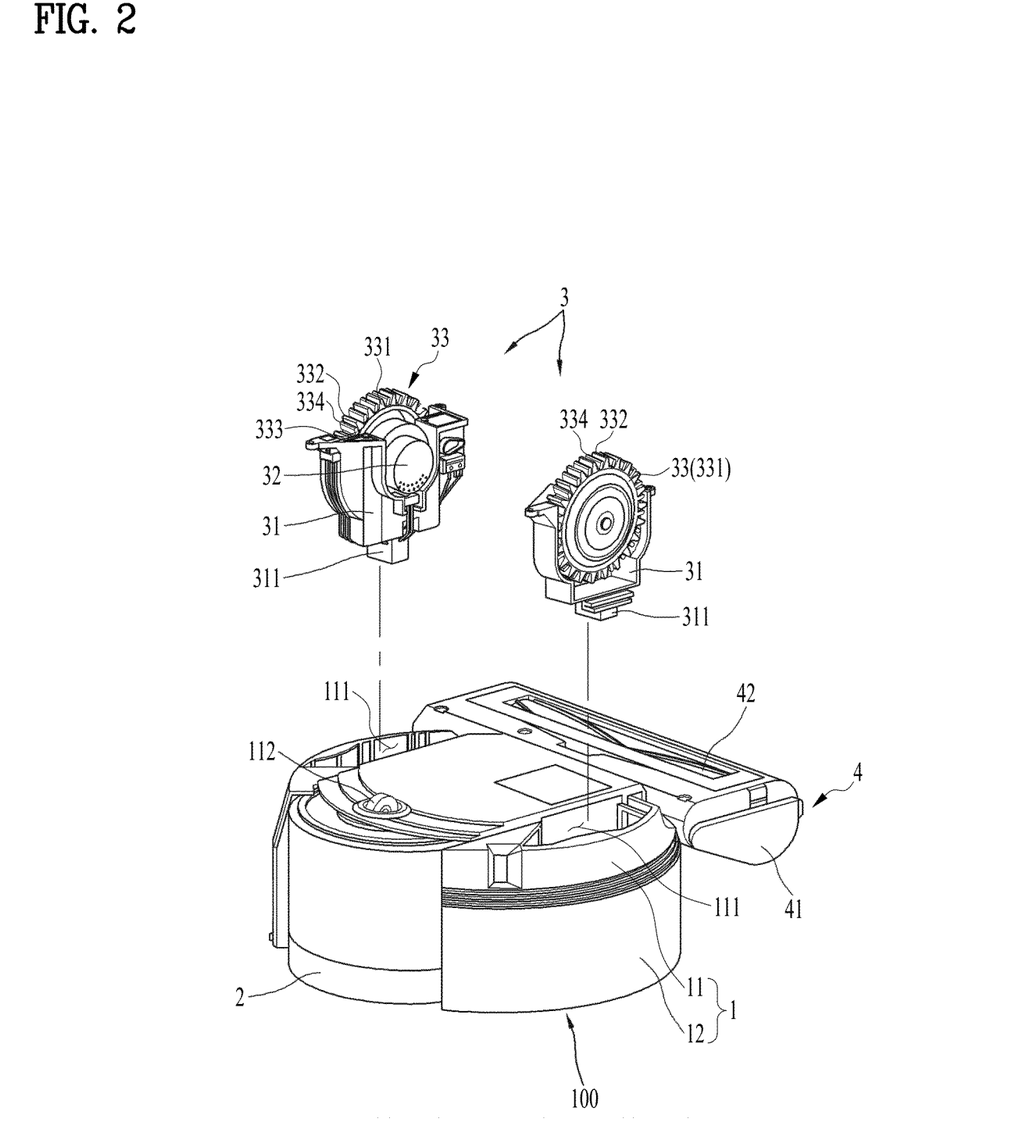
FIG. 2 is a bottom view of a robot cleaner according to an embodiment.

FIG. 2 is a bottom view of a robot cleaner according to an embodiment.

The robot cleaner 100 may include the drivers 3.

The drivers 3 may be arranged to move the main body 1. The drivers 3 may be arranged to be detachable from the main body 1.

As shown in FIG. 2, each driver 3 may have a fastening portion 311, and the main body 1 may have receiving portions 111 defined therein for respectively receiving the drivers 3 therein. Each coupling portion (not shown) having a shape corresponding to each fastening portion 311 may be defined in each receiving portion 111. As each fastening portion 311 is connected to each coupling portion, each driver 3 may be coupled to the main body 1.

Each fastening portion 311 and each coupling portion are connected to each other, so that each driver 3 may be integrally coupled with the main body 1. Accordingly, the main body 1 may perform the cleaning of the region to be cleaned while moving by the operation of the drivers 3.

Each receiving portion 111 may be defined in a bottom face of the robot cleaner 100.

Each driver 3 may include a wheel cover 31, a driving module 32, and a wheel 33. Specifically, each driver 3 may include the driving module 32 that generates a driving force, the wheel 33 constructed to be rotatable by the driving module 32, and the wheel cover 31 disposed to cover the driving module 32 and the wheel 33.

The wheel cover 31 may be a portion that provides a space for receiving the driving module 32 and the wheel 33 to be described later therein. The fact that the wheel cover 31 provides the space for receiving the driving module 32 and the wheel 33 therein may not simply mean that the wheel cover 31 receives the driving module 32 and the wheel 33 therein by covering an entirety of the driving module 32 and the wheel 33. That is, the wheel cover 31 is sufficient to provide a space for the wheel 33 and the driving module 32 to be seated.

Each fastening portion 311 described above may be disposed on each wheel cover 31 to connect each driver 3 to the main body 1.

The driving module 32 is constructed to generate the driving force and transmit the driving force to the wheel 33, and is coupled to the wheel cover 31 so as to be movable in a vertical direction. The vertical movement of each driving module 32 may be guided by guide bars 3121 of buffers 312 to be described later. A detailed configuration of the driving module 32 will be described in detail later.

The wheels 33 may be constructed to rotate by receiving electric power. The wheels 33 may be disposed on both sides of the main body 1, respectively.

The wheel 33 disposed on one side and the wheel 33 disposed on the other side may be controlled independently of each other. That is, the wheel 33 disposed on one side and the wheel 33 disposed on the other side may be rotated at different rotational speeds.

Therefore, the robot cleaner 100 may rotate in a left or right direction. In addition, the robot cleaner 100 may change a direction in addition to a forward or backward movement.

That is, a travel speed of the robot cleaner 100 may be determined based on the rotational speed of the wheel 33 and the travel direction may be determined based on a difference in the rotational speeds of the wheels 33.

For example, when the wheel 33 located on the left side of the robot cleaner is maintained in a stopped state and the wheel 33 located on the right side rotates, the robot cleaner 100 may be rotated in the left direction. When both wheels 33 are in operation, but the wheel 33 on the right rotates faster than the wheel 33 on the left, as the direction is changed to the left direction, the robot cleaner may continue to move forward.

Because the robot cleaner 100 performs the cleaning while essentially moving in the region to be cleaned, the suction portion housing 41 may not move smoothly during the travel. Therefore, an auxiliary wheel 112 may be disposed for the smooth travel. As the auxiliary wheel 112 is disposed, the suction portion housing 41 may move more smoothly during the travel of the robot cleaner 100.

However, the present disclosure is not limited to the above-described example, and the above-described example is only one embodiment. The photographing sensor and the obstacle sensor may simultaneously perform wall sensing.

The photographing sensor may be disposed not only to sense the region to be cleaned, but also to specify a position of the main body 1 in the region to be cleaned that is previously input. Thus, a position of the space where the robot cleaner 100 performs the cleaning may be specified. As the position of the robot cleaner 100 is specified, a movement to a next cleaning area may be guided.

A type and the number of sensor units 121 are not limited. That is, a plurality of photographing sensors may be arranged, and when the plurality of photographing sensors are arranged, the plurality of photographing sensors may be photographing sensors of the same type or different types.

The robot cleaner 100 may vary a suction strength of the dust collector 2 based on a material of the floor. This is because when the dust collector 2 always sucks the dust at the same strength, it may be difficult to completely perform the cleaning on an unusual floor face such as the carpet and the like.

The robot cleaner 100 may include a floor sensor (not shown) to sense the material of the floor. The floor sensor may be a sensor that senses the material of the floor. The floor sensor may be disposed in the sensor unit 121 described above, or may be disposed at a position different from the sensor unit 121.

The region to be cleaned in which the robot cleaner 100 is used may vary depending on a case. For example, a floor material of the region to be cleaned may be marble or a floor paper. Further, the region to be cleaned may be made of a material other than the above example.

Depending on the material of the floor, an intensity at which the dust collector 2 is driven to effectively suck the dust may vary.

Specifically, the dust collector 2 must be driven more strongly in a carpeted region than on a general floor paper to effectively perform cleaning. The controller of the robot cleaner 100 may adjust the driving intensity of the dust collector 2 based on the type of floor material.

The obstacle sensor may determine whether an obstacle exists in the region to be cleaned. The obstacle sensor may be disposed integrally with the sensor unit 121 described above, or may be disposed separately. That is, the photographing sensor may also serve as the obstacle sensor.

As the obstacle sensor senses the obstacle, a travel path of the robot cleaner 100 may be changed. As a moving line becomes complicated, battery consumption may vary. Specifically, when the obstacle is present, the robot cleaner 100 is moved to bypass the obstacle. At this time, the moving line may be lengthened. As the moving line lengthens, a battery consumption for cleaning the corresponding area may increase.

The driver 3 will be described in detail with reference to FIGS. 2 to 5.

Each driver 3 may include the buffers 312 constructed to allow the driving module 32 and the wheel 33 to move in the vertical direction in the wheel cover 31.

Each buffer 312 may include a guide bar 3121 and an elastic member 3122.

The buffers 312 may be respectively inserted into through-holes 312a defined in each wheel cover 31 to be connected to each driving module 32.

The guide bars 3121 are constructed to guide the vertical movement of the driving module 32. The guide bars 3121 are formed to extend in one direction, penetrate the driving module 32, and extend in the wheel cover 31 in the vertical direction.

It is shown in the present drawing that the guide bars 3121 are formed to penetrate the driving module 32 in the left and right sides of the driving module 32, respectively.

Both upper and lower ends of the guide bar 3121 may be fixed to the wheel cover 31. In the present drawing, the upper end of the guide bar 3121 may be fixed at a top of the wheel cover 31 and the lower end of the guide bar 3121 may be fixed to a bottom of the wheel cover 31.

The elastic member 3122 may be disposed to absorb a shock when the driving module 32 moves in the vertical direction. The elastic member 3122 may be connected to the wheel cover 31 and the driving module 32.

Specifically, the elastic member 3122 may be formed as a coil spring surrounding the guide bar 3121. However, a type of elastic member is not limited thereto, and any type of the elastic member is possible as long as the shock may be relieved and the driving module 32 may be moved in the vertical direction.

Buffer spaces 321 may be defined in each driving module 32 to respectively provide spaces in which the buffers 312 may be received, respectively. Each buffer 312 may be received in each buffer space 321.

The wheel 33 may include a wheel body 331, treads 332, bents 333, and ribs 334.

The wheel body 331 may be disposed to be coupled to the driving module 32. The wheel body 331 may form an appearance of the wheel 33. That is, the wheel body 331 may include a side wall and a bead.

The treads 332 may be formed integrally with the wheel body 331 and may include a plurality of treads along a circumferential face of the wheel body 331. The treads 332 may form a pattern of the wheel 33.

A thickness of the tread 332 may not be constant. That is, a thickness of a portion of the tread 332 positioned at a center of the wheel body 331 in a width direction may be greater than portions positioned on both sides of the wheel body 331 in the width direction. For example, a shape of a contact face of the tread 332 to be in contact with a road face may be formed such that a thickness of a portion positioned at a center of the wheel body in a thickness direction is great and a thickness of portions positioned on both sides of the wheel body 331 in the thickness direction is small.

As the contact face of the tread 332 to be in contact with the road face is formed in an octagonal shape, the travel and climbing may be stably performed. Specifically, a thickness of a portion near the center of the tread 332 may be great and a thickness of a portion near an edge may be smaller than the thickness of the portion near the center of the tread 332. When traveling in a straight line, the tread 332 may be stably in contact with the traveling face, and when changing the direction, the tread 332 may reduce a resistance caused by the traveling face, so that smooth direction change may be achieved.

That is, the tread 332 may have the contact face in contact with the road face in the octagonal shape or a shape similar to the octagonal shape.

A contact force or a frictional force with the road face may vary based on the pattern shape of the tread 332, so that travel stability may vary.

The treads 332 may be arranged on the circumferential face of the wheel body 331 to be spaced apart from each other.

The bents 333 may mean portions between the treads 332. Each bent 333 may be defined in a form recessed inward of the wheel body 331 between the two adjacent treads 332.

The ribs 334 may be integrally formed with the wheel body 331, and each rib 334 may be formed between the two adjacent treads 332 to protrude outward in a radial direction of the wheel 33. That is, each rib 334 may be located in each bent 333 between the two adjacent treads 332.

The rib 334 may be formed to protrude to have a height equal to or similar to a height of the tread 332. When the rib 334 protrudes more than the tread 332, the travel stability may be deteriorated when the robot cleaner travels.

For example, when the rib 334 is disposed to protrude more than the tread 332, rattling may occur when the robot cleaner performs the cleaning. In addition to the deterioration of the travel stability, connection between interior electric components may be weakened or the electric components may be deviated from original positions thereof when the robot cleaner is constantly shaken.

Therefore, it is not preferable that the rib 334 has a height greater than that of the tread 332.

As the rib 334 is disposed, a foreign substance may be prevented from being caught in the bent 333. Specifically, the foreign substance such as an electric wire may be prevented from being caught in the bent 333 defined between the two adjacent treads 332. When the wire gets caught when the robot cleaner travels, home appliances may not operate smoothly, or a failure of the robot cleaner may be caused.

The rib 334 may have a thickness smaller than that of the tread 332. Unlike the tread 332, the rib 334 is not disposed to increase the contact force with the road face or secure the friction force with the road face, so that the rib 334 does not need to be thick.

In addition, the rib 334 may have a width smaller than that of the tread 332. In other words, the width of the rib 334 may be smaller than the width of the tread 332.

Because the rib 334 is disposed to prevent the foreign substance from being caught, the rib 334 is not necessary to be larger than the tread 332. That is, the width of the rib 334 may be equal to or smaller than the width of the tread 332.

Figure 3:
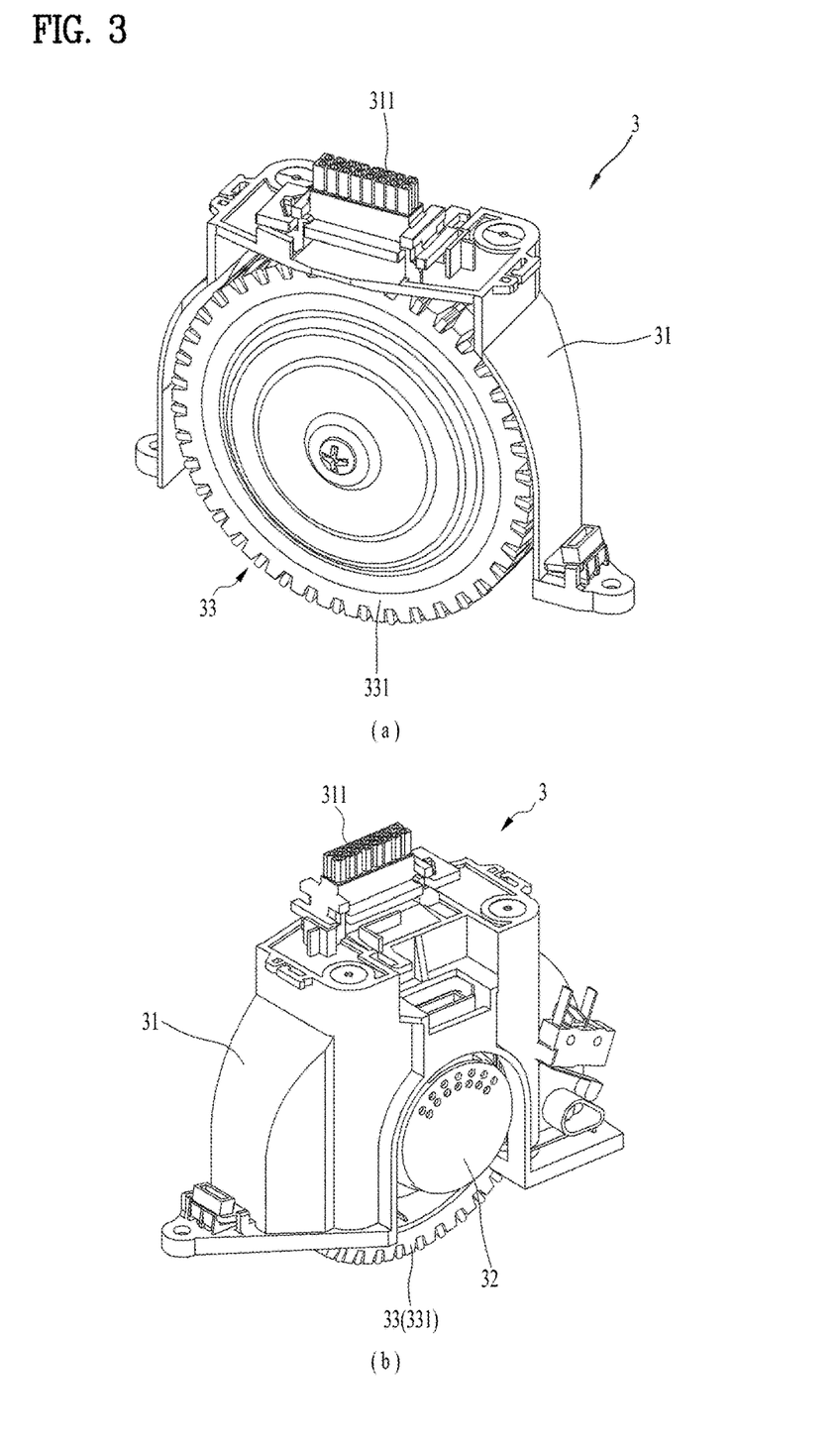
FIG. 3 is a view illustrating a driver of a robot cleaner according to an embodiment of the present disclosure.
Figure 4:
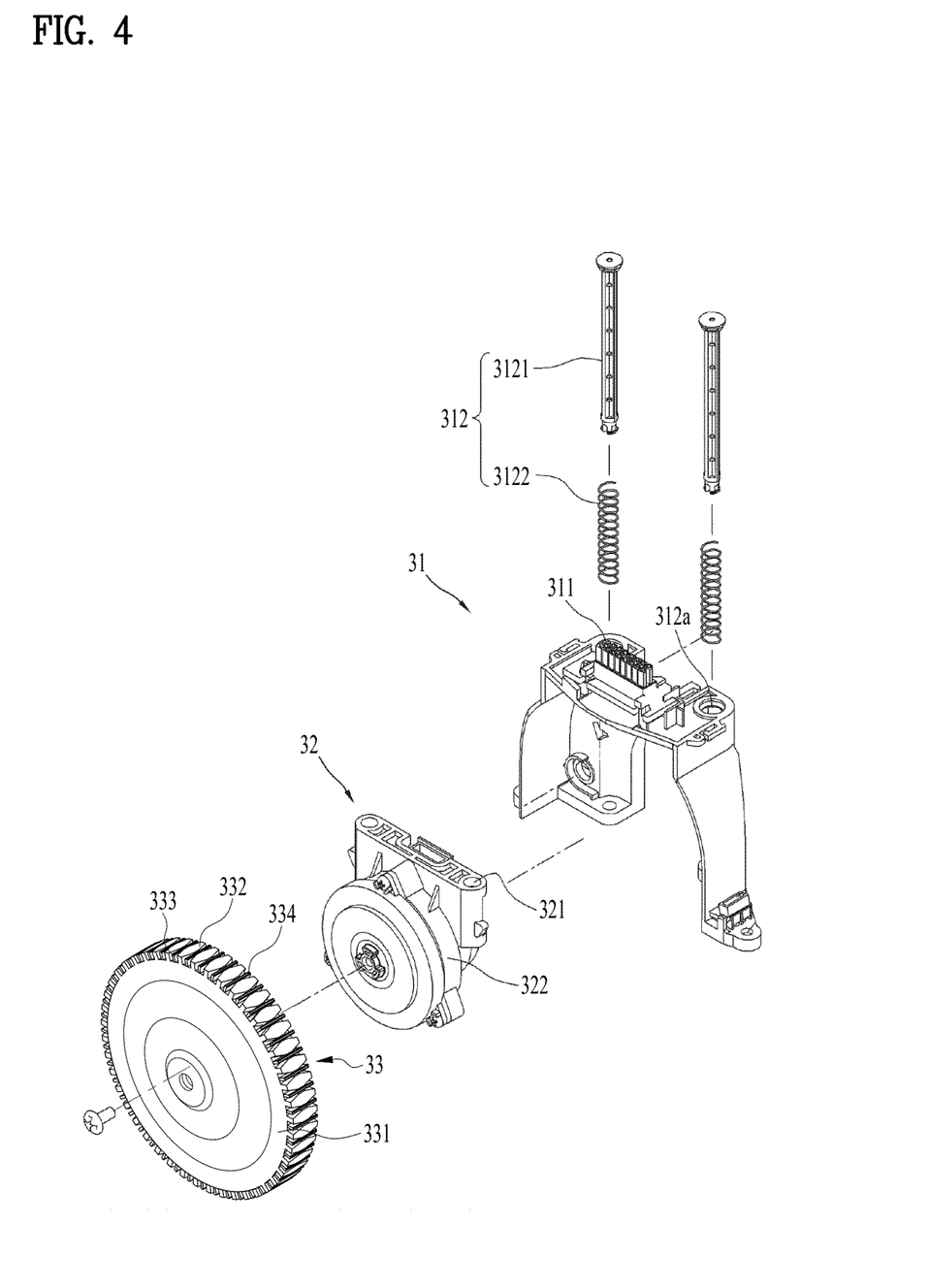
FIGS. 4 and 5 are exploded perspective views of a driver of a robot cleaner according to an embodiment of the present disclosure.
Figure 5:
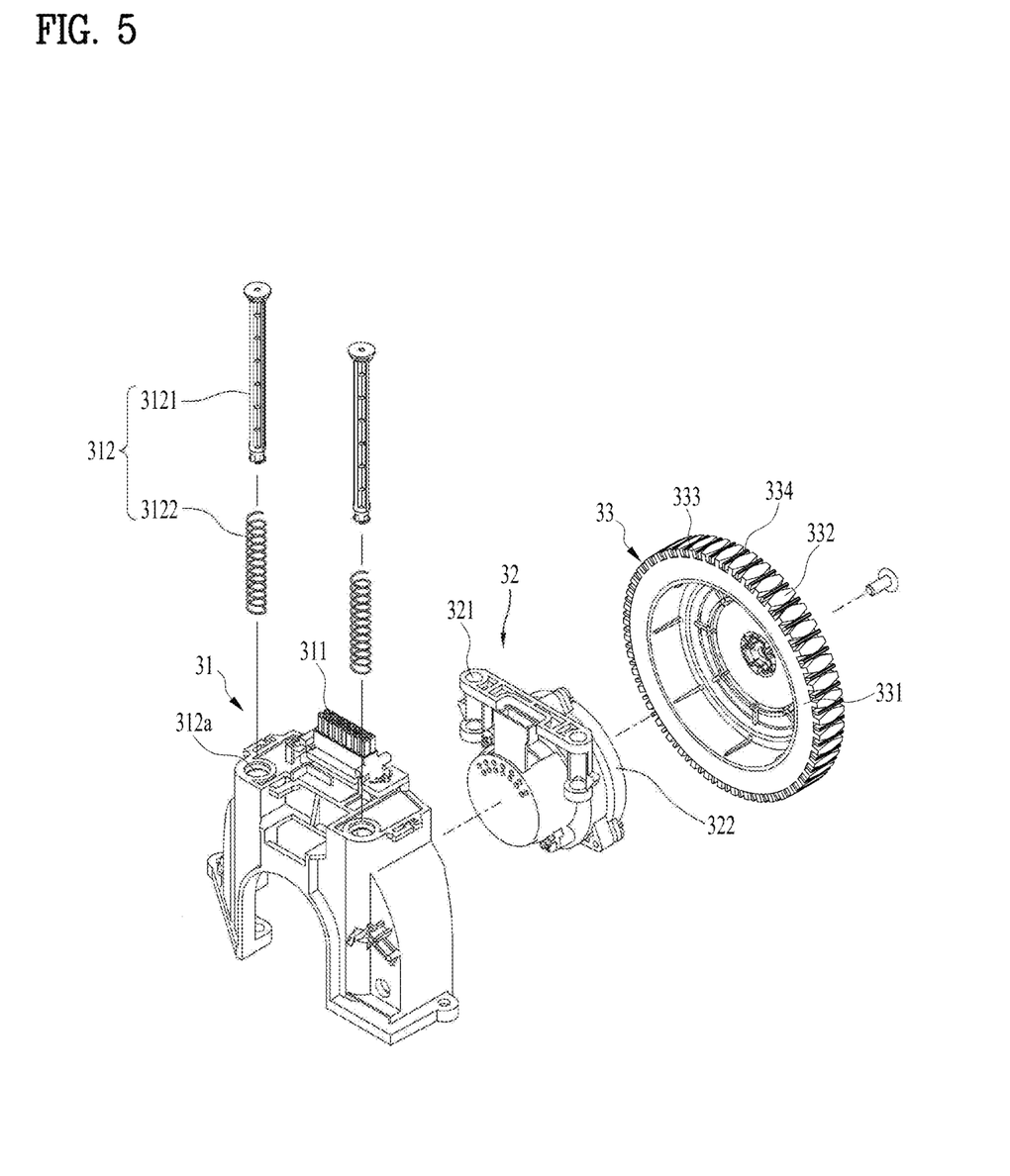

FIGS. 3 to 5 show that each of all the ribs 334 is disposed between every adjacent two of all the treads 332, but it is not necessary for the ribs 334 to be respectively disposed in all of the bents 333. Because the rib 334 plays a role of preventing the foreign matter from being caught, it is sufficient when an appropriate number of the ribs 334 are arranged in consideration of the travel speed of the robot cleaner, a size of the wheel, and the like.

Accordingly, the ribs 334 may be respectively formed in some of the spaces defined by the plurality of treads 332. However, the present disclosure may not be limited thereto, and each rib 334 may be disposed between every adjacent two of all the treads 332.

Figure 6:
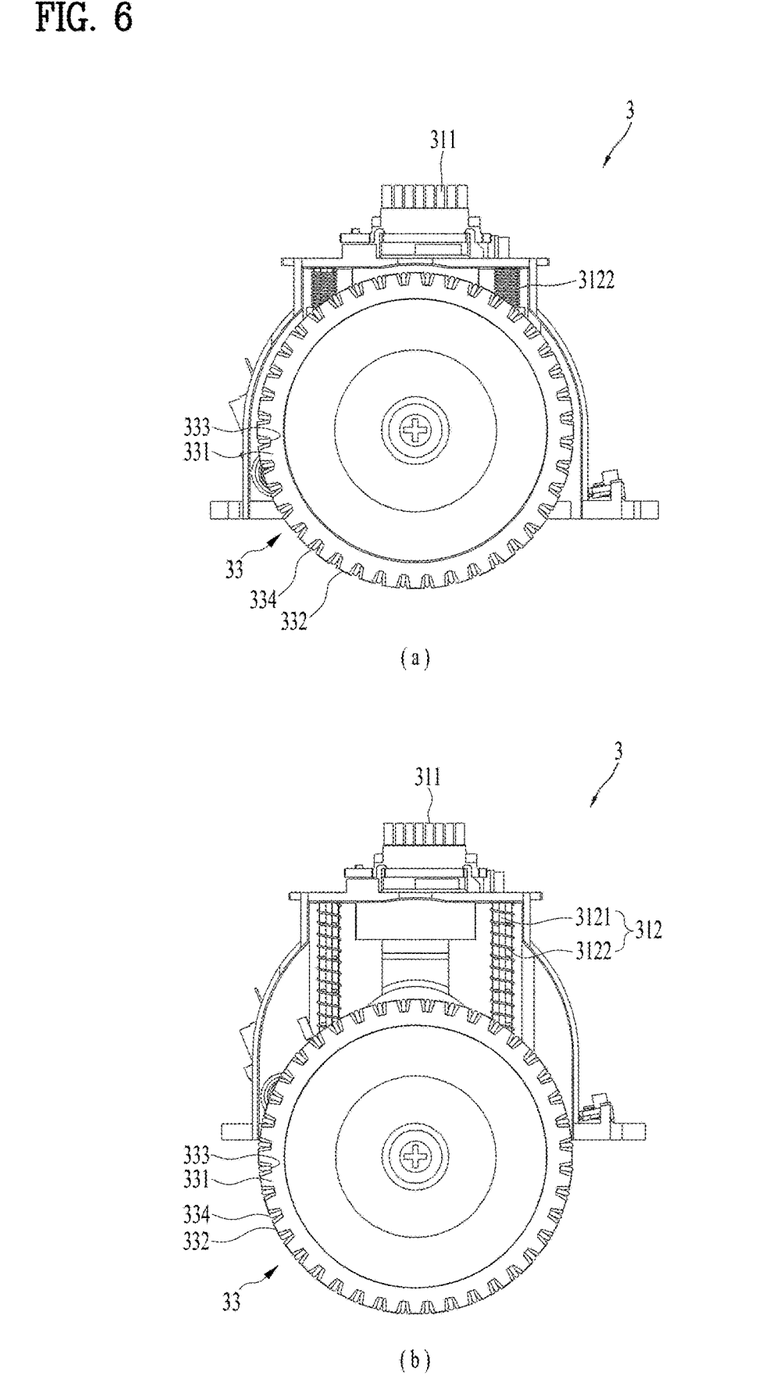
FIG. 6 is a view illustrating an operation of a driver according to an embodiment of the present disclosure.

FIG. 6 is a view illustrating various states of a driver of a robot cleaner according to an embodiment.

(a) in FIG. 6 is a view illustrating a state in which the wheel is inserted into an innermost side of the wheel cover, and (b) in FIG. 6 is a view illustrating a state in which the wheel protrudes to an outermost side of the wheel cover.

Hereinafter, for convenience of description, a state as shown in (a) in FIG. 6 is described as a first state, and a state as shown in (b) in FIG. 6 is described as a second state.

The first state may be a state in which the wheel of the robot cleaner is in contact with the road face and a self-load of the robot cleaner is transmitted to the wheel 33. In other words, it represents a state in which the wheel 33 is in contact with the floor and supports the main body 1 of the robot cleaner.

In other words, in the first state, the robot cleaner may travel normally.

In the second state, the self-load of the robot cleaner may not be transmitted to the road face. In other words, it represents a state in which the wheel 33 has lost contact with the floor. That is, it may be difficult for the robot cleaner to travel normally despite the rotation of the wheel 33 as in a case in which a portion of the robot cleaner is caught in a stepped terrain.

The robot cleaner according to an embodiment may control the rotation of the wheel 33 by determining whether the wheel 33 is in contact with the floor.

Specifically, when the wheel 33 loses contact with the floor and the robot cleaner becomes in the second state, the driving of a driving motor is stopped, thereby preventing the wheel 33 from idling unnecessarily.

When the wheel 33 contacts the floor again, the driving motor may be driven again to rotate the wheel 33. Thus, the wheel may be controlled properly based on the state of the robot cleaner.

Figure 7:
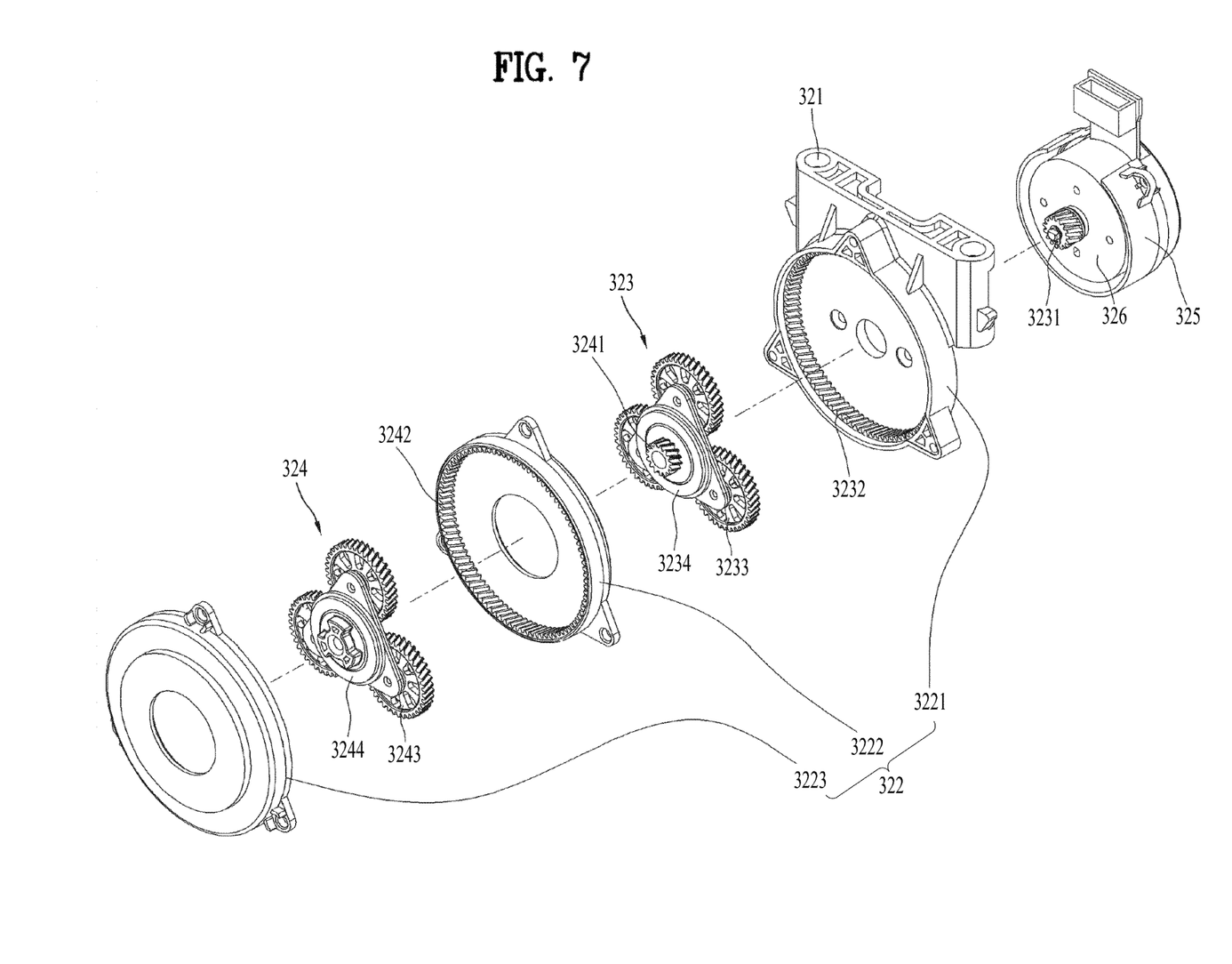
FIG. 7 is an exploded perspective view of a driving module according to an embodiment of the present disclosure.

Hereinafter, the driving module 32 will be described with reference to FIG. 7.

The driving module 32 may be coupled to the wheel body 331 and the wheel cover 31. Specifically, the driving module 32 may be coupled to the wheel cover 31 so as to movable in the vertical direction.

Each buffer space 321 through which each guide bar 3121 passes is defined in the casing 322. The buffer spaces 321 may be defined on both left and right sides of the casing 322, respectively. The casing 322 is constructed to be movable in the vertical direction along the guide bar 3121.

The driving motor (not shown) is mounted on one side of the casing 322.

A sun and planet gear assembly connects the driving motor and the wheel 33 with each other, decelerates the rotation of the driving motor, and transmits the decelerated rotation of the driving motor to the wheel 33. The sun and planet gear assembly is disposed on the other side of the casing 322. The sun and planet gear assembly may be composed of one or more stages. In the present drawing, the sun and planet gear assembly is composed of two stages, but is not limited thereto.

A sun gear is mounted on a rotation shaft of the driving motor, and the wheel 33 is mounted on a cage that rotatably supports a spinning shaft of each of a plurality of planet gears. With the above structure, the rotation shaft of the driving motor and the rotation axis of the wheel 33 are placed on the same axis.

A space capable of receiving at least a portion of the driving module 32 is defined inside the wheel 33. The sun and planet gear assembly is completely received in the space, so that a circumference of the sun and planet gear assembly may be surrounded by the wheel 33. Therefore, the sun and planet gear assembly are not visible from the outside.

As such, the gearing that decelerate the rotation of the driving motor and transmits the decelerated rotation to the wheel 33 is formed as the sun and planet gear assembly, so that the rotation shaft of the driving motor and the rotation axis of the wheel 33 are placed on the same axis, and the sun and planet gear assembly is received inside the wheel 33, thereby miniaturizing the structure related to the driving of the wheel 33. This may contribute to miniaturization of the cleaner 100 or increase in a volume of another component.

In order to obtain an appropriate deceleration ratio, the sun and planet gear assembly may be composed of a combination of a first sun and planet gear 323 and a second sun and planet gear 324, that is, two stages. The first sun and planet gear 323 is linked with the rotation shaft of the driving motor. The second sun and planet gear 324 is linked with the first sun and planet gear 323 and is connected with the wheel 33.

In a detailed structure thereof, the casing 322 includes a main casing 3221, a middle casing 3222, and a front casing 3223.

The main casing 3221 has each buffer space 321 through which each guide bar 3121 passes. The driving motor is mounted in one side of the main casing 3221, and the first sun and planet gear 323 is received in the other side of the main casing 3221. The rotation shaft of the driving motor is formed to penetrate the main casing 3221.

The first sun and planet gear 323 includes a first sun gear 3231, a first ring gear 3232, a plurality of first planet gears 3233, and a first cage 3234.

The first sun gear 3231 is coupled to the rotation shaft of the driving motor and exposed to the other side of the main casing 3221. The first sun gear 3231 may be constructed to rotate in both directions in response to a driving signal applied from the controller.

The first ring gear 3232 is formed to surround the first sun gear 3231 on the other side of the main casing 3221. The first sun gear 3231 is placed at a center of the first ring gear 3232. As shown, the first ring gear 3232 may be formed on the main casing 3221 itself.

The plurality of first planet gears 3233 are constructed to be engaged with the first sun gear 3231 and the first ring gear 3232 to spin and revolve around the first sun gear 3231 at the same time. In the present structure in which the first ring gear 3232 is fixed, a spinning direction of each of the plurality of first planet gears 3233 is a direction opposite to a rotation direction of the first sun gear 3231, and a revolution direction thereof is the same as the rotation direction of the first sun gear 3231.

The first cage 3234 rotatably supports the spinning shaft of each of the plurality of first planet gears 3233. The first cage 3234 is disposed to cover a portion of each of the plurality of first planet gears 3233. The first cage 3234 may be disposed to cover the first sun gear 3231. In this case, the first cage 3234 may be constructed to rotatably support the rotation shaft of the first sun gear 3231.

The middle casing 3222 is coupled to the main casing 3221. One side of the middle casing 3222 is disposed to cover the first sun and planet gear 323, and the other side of the middle casing 3222 receives the second sun and planet gear 324 therein. In the middle casing 3222, a hole for connection between the first sun and planet gear 323 and the second sun and planet gear 324 is defined.

The second sun and planet gear 324 includes a second sun gear 3241, a second ring gear 3242, a plurality of second planet gears 3243, and a second cage 3244.

The second sun gear 3241 protrudes from the first cage 3234 and exposed to the other side of the middle casing 3222 through the hole.

The second ring gear 3242 is formed on the other side of the middle casing 3222 to surround the second sun gear 3241. The second sun gear 3241 is placed at a center of the second ring gear 3242. As shown, the second ring gear 3242 may be formed on the middle casing 3222 itself.

The plurality of second planet gears 3243 are constructed to be engaged with the second sun gear 3241 and the second ring gear 3242 to spin and revolve around the second sun gear 3241 at the same time. In the present structure in which the second ring gear 3242 is fixed, a spinning direction of each of the plurality of second planet gears 3243 is a direction opposite to a rotation direction of the second sun gear 3241, and a revolution direction thereof is the same as the rotation direction of the second sun gear 3241.

The second cage 3244 rotatably supports the spinning shaft of each of the plurality of second planet gears 3243. The second cage 3244 is disposed to cover a portion of each of the plurality of second planet gears 3243. The second cage 3244 may be disposed to cover the second sun gear 3241. In this case, the second cage 3244 may be constructed to rotatably support the rotation shaft of the second sun gear 3241.

The front casing 3223 is disposed to be coupled to the middle casing 3222 and cover the second sun and planet gear

324. In the front casing 3223, a hole for connection between the second sun and planet gear 324 and the wheel 33 is defined.

The second cage 3244 has a protrusion inserted into the hole, and the protrusion has a coupling protrusion that is engaged with a coupling groove of the wheel 33. The coupling protrusion is engaged with a coupling groove 123*b* to prevent the wheel 33 from idling during the rotation by receiving the driving force through the sun and planet gear assembly.

Figure 8:
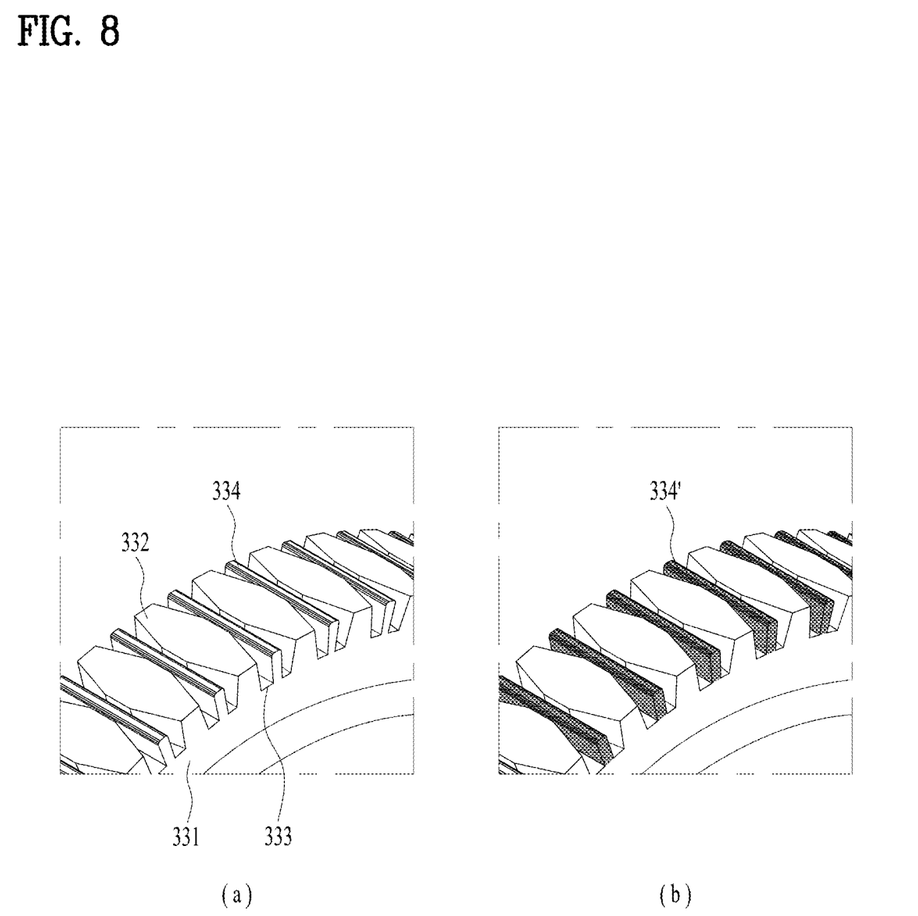
FIG. 8 is a view illustrating various embodiments of ribs according to an embodiment of the present disclosure.

FIG. 8 is a view illustrating various embodiments of a robot cleaner.

(a) in FIG. 8 is a view illustrating that the rib is made of the same material as the wheel, and (b) in FIG. 8 is a view illustrating that the rib is made of a material different from that of the wheel.

There is no restriction on the material of the wheel 33, but in general, the wheel 33 may be made of a material having excellent elasticity such as rubber, urethane, and the like.

There is no restriction on a type of the rib 334. That is, the rib 334 may be made of the same material as the tread 332 as shown in (a) in FIG. 8, or may be made of a material different from that of the tread 332 as shown in (b) in FIG. 8.

When tread 332 and the rib 334 are made of the same material, manufacturing may be facilitated. Even when the tread 332 and the rib 334 are made of the same material, the tread 332 and the rib 334 may have different thicknesses or shapes.

The tread 332 is a portion disposed for the stable travel of the robot cleaner 100 through the contact with the road face, and the rib 334 is a portion disposed to prevent the foreign substance from being caught between the two adjacent treads 332, so that it is not preferable that the tread 332 and the rib 334 are formed in the same shape.

As shown in (b) in FIG. 8, the tread 332 and the rib 334 may be made of different materials. As described above, because the roles of the tread 332 and the rib 334 are different, the rib 334 is not necessarily made of the same material as the tread 332.

That is, the tread 332 and the rib 334 may be made of materials having different hardnesses. Specifically, a hardness of the tread 332 may be greater than that of the rib 334.

Because the rib 334 is disposed to prevent the foreign substance from being caught, it is preferable that the rib 334 is bent with a little force to easily remove the foreign substance when the foreign substance such as the electric wire is caught between the rib 334 and the tread 332. On the other hand, it is preferable that the tread 332 is not bent easily for the stable travel of the robot cleaner.

Specifically, it is preferable that the tread 332 is not bent by the self-load of the robot cleaner.

In one example, even when the rib 334 is made of the same material as the tread 332, because the thicknesses of the tread 332 and the rib 334 are different from each other, the tread 332 may not be bent by the self-load of the robot cleaner and the rib 334 may be easily bent by a hand of the user, as described above.

However, when the tread 332 and the rib 334 are made of the same material, through the adjustment of the thicknesses and the shapes of the tread 332 and the rib 334, the tread 332 should be formed so as not to be bent even by the self-load of the robot cleaner and the rib 334 should be formed such that the user may easily remove the foreign substance, so that a choice of a manufacturer may be narrowed.

Therefore, a size and a shape of the wheel 33 may be freely selected by selecting different materials for the tread 332 and the rib 334.

Figure 9:
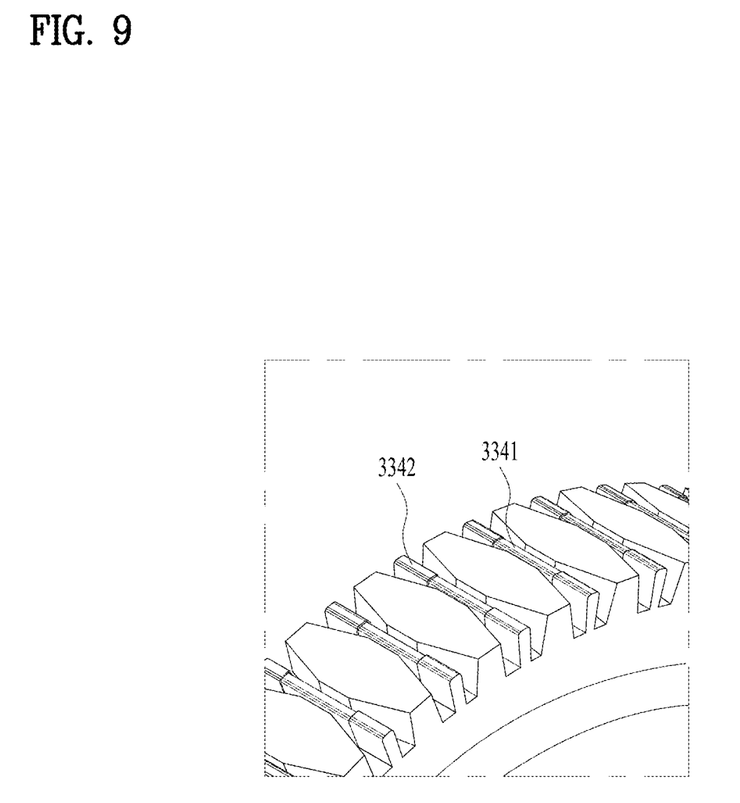
FIG. 9 is a view illustrating ribs according to another embodiment of the present disclosure.

FIG. 9 is a view illustrating ribs of a robot cleaner according to another embodiment.

Referring to FIG. 9, the rib 334 may include a central portion 3341 and wing portions 3342.

The central portion 3341 may be a portion positioned adjacent to the center of the tread 332, and the wing portions 3342 may be portions respectively positioned on both sides of the central portion 3341. The central portion 3341 and the wing portions 3342 may be integrally formed.

In a description focusing on the wheel body 331, the wing portions 3342 are portions located on both sides of the wheel body 331 in the width direction, and the central portion 3341 is a portion containing a center of the wheel body 331 in the width direction.

A thickness of the wing portion 3342 may be greater than that of the central portion 3341. In general, the electric wire or the like starts to be caught at a position of the wing portion 3342 when being caught between the two adjacent treads 332 during the travel of the robot cleaner.

Therefore, when the thickness of the wing portion 3342 is greater than that of the central portion 3341, the wing portion 3342 may perform a function of preventing the foreign substance from being caught to some extent.

In addition, when the wing portion 3342 is thicker than the central portion 3341, and when the robot cleaner moves a threshold or the stepped terrain diagonally, the wing portion 3342 of the robot cleaner touches the stepped terrain first. In this case, because a great load is applied to one of the wing portions 3342, it is preferable that the wing portion 3342 is thick.

In addition, as described above, the edges of the tread 332 may be thinner than the portion of the tread 332 located at the center of the width direction of the wheel body 331. That is, a distance between the two adjacent treads 332 is greater at the edge of the wheel body 331 than at the center of the width direction. In other words, a spacing between the respective edges of the two adjacent treads 332 is greater than that between the respective portions of the two adjacent treads 332 located at the center of the width direction of the wheel body 331. Therefore, even when the great load is applied to the wing portion 3342, a space in which the wing portion 3342 may be sufficiently bent is defined, so that the climbing may be performed easily.

The central portion 3341 may be bent when the robot cleaner passes the stepped terrain while moving forward. In addition, even when only the wing portion 3342 is bent, the central portion 3341 may play a role of providing a restoring force for returning the wing portion 3342 to an original position thereof.

Figure 10:
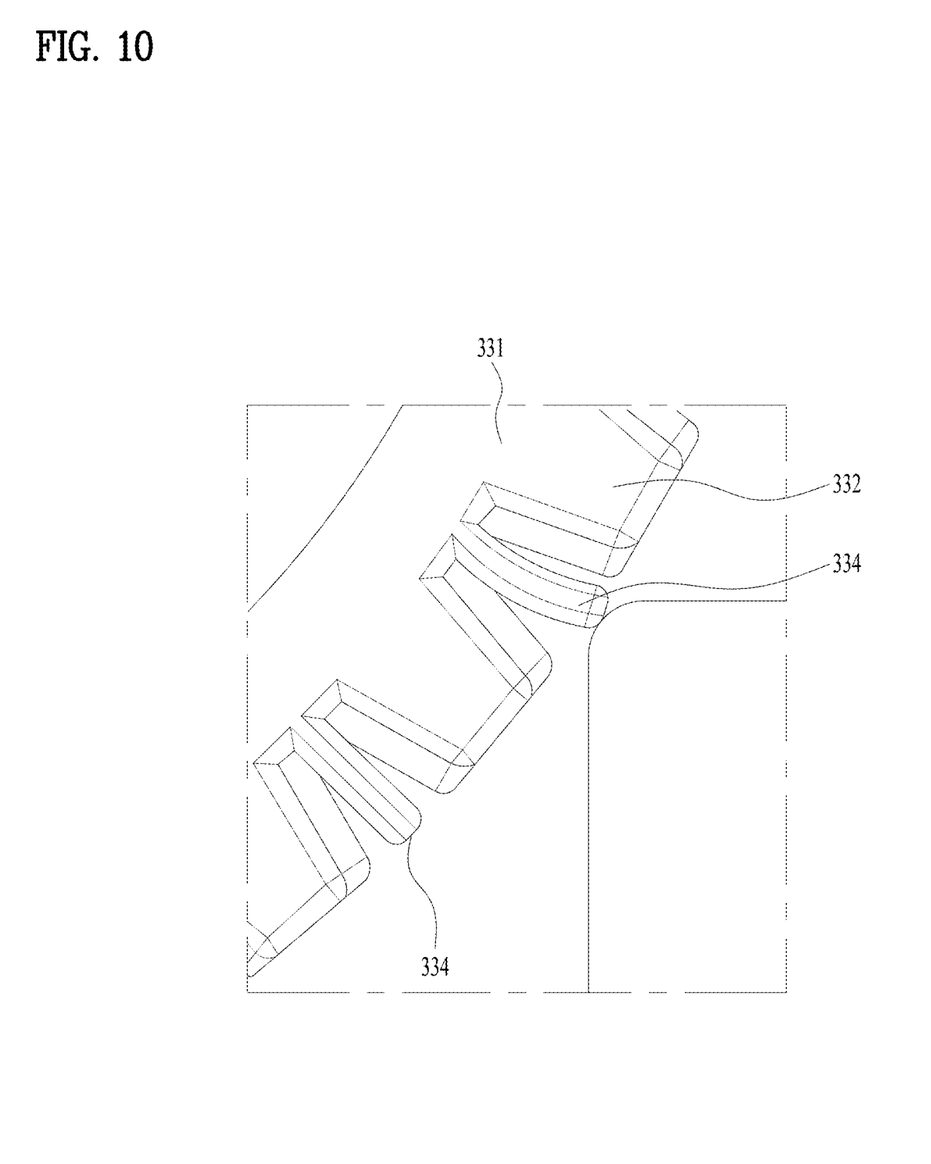
FIG. 10 is a view illustrating an operation of a robot cleaner according to an embodiment of the present disclosure.

FIG. 10 is a view illustrating a state when a robot cleaner is climbing according to an embodiment.

Referring to FIG. 10, the rib 334 of the robot cleaner according to an embodiment may be constructed to be bent when passing the stepped terrain.

As the ribs 334 are arranged, the foreign substance may be prevented from being caught between the treads 332, but a climbing performance may be lowered by the ribs 334. In general, when the robot cleaner passes the stepped terrain, as the stepped terrain gets caught in the bent 333 defined between the two adjacent treads 332 and the tread 332 pushes the terrain, the robot cleaner climbs the stepped terrain.

When the ribs 334 are arranged, it is difficult for the stepped terrain to be settled in the bent 333. Therefore, the rib 334 may be constructed to be bent when the stepped terrain gets caught, as shown in the drawing.

When the rib 334 is constructed to be bent in a case where the load of the robot cleaner is transmitted to one face of the rib 334, the rib 334 may exhibit the effect of preventing the foreign substance from being caught and the effect of preventing degradation in the climbing performance at the same time.

In this connection, the one face of the rib 334 means a face pressed by the stepped terrain when the wheel 33 rotates. In other words, the one face of the rib 334 refers to a face neighboring a face in contact with the road face when traveling on the flat road face rather than a face in contact with the road face when traveling on the flat road face.

Although the exemplary embodiment of the present disclosure has been described above in detail, those of ordinary skill in the art to which the present disclosure pertains will appreciate that various modifications are possible within the limits without departing from the scope of the present disclosure provided by the claims to be described later.

The invention claimed is:

1. A robot cleaner comprising:
   a main body for forming an exterior of the robot cleaner;
   a wheel cover detachably provided on the main body;
   a driving module movably coupled to the wheel cover; and
   a wheel coupled to the driving module and rotated by receiving a driving force from the driving module,
   wherein the wheel includes:
      a wheel body coupled to the driving module and forming an appearance of the wheel;
      a plurality of treads arranged along a circumferential face of the wheel body and spaced apart from each other; and
      a plurality of ribs respectively disposed between the treads and protruding radially outward of the wheel,
   wherein a rib of the plurality of ribs includes a central portion and wing portions positioned on both sides of the central portion in a width direction of the wheel body,
   wherein a wing portion of the wing portions is thicker than the central portion, and
   wherein, with respect to the width direction of the wheel body, a first spacing between an edge portion of an adjacent one of the plurality of treads and one of the wing portions is greater than a second spacing between a center of the adjacent one of the plurality of treads and the central portion.

2. The robot cleaner of claim 1, wherein the rib protrudes to have the same height as a tread of the plurality of treads.

3. The robot cleaner of claim 1, wherein the rib protrudes to have a smaller height than a tread of the plurality of treads.

4. The robot cleaner of claim 1, wherein the rib has a smaller thickness than a tread of the plurality of treads.

5. The robot cleaner of claim 4, wherein the tread is formed such that a center thereof has a greater thickness than both ends thereof in the width direction of the wheel body.

6. The robot cleaner of claim 5, wherein the tread has a contact face in contact with a ground in an octagonal shape.

7. The robot cleaner of claim 1, wherein the rib has a smaller width than a tread of the plurality of treads.

8. The robot cleaner of claim 1, wherein the rib is made of the same material as a tread of the plurality of treads.

9. The robot cleaner of claim 1, wherein the rib is made of a material different from a material of a tread of the plurality of treads.

10. The robot cleaner of claim 1, wherein an inter-tread space of a plurality of spaces are defined inter-tread spaces is respectively located between every adjacent two treads of the plurality of treads, and
    wherein the plurality of ribs are arranged in a remaining subset of said plurality of inter-tread spaces excluding at least one of the plurality of inter-tread spaces.

11. The robot cleaner of claim 1, wherein the rib has elasticity to be bent by being pressed by a ground.

12. The robot cleaner of claim 1, wherein the driving module is provided in the wheel cover to be movable in a vertical direction,
    wherein the rib has a height allowing the rib not to be in contact with each wheel cover in a state where the driving module is maximally in close contact with the wheel cover.

13. The robot cleaner of claim 1, wherein the wheel further includes a plurality of bent portions defined by being recessed inward of the wheel body between the treads,
    wherein the rib protrudes from a portion of the plurality of bent portions radially outward of the wheel body.

14. The robot cleaner of claim 1, wherein the central portion is positioned adjacent to a center of an adjacent one of the plurality of treads, and the wing portions are positioned on both sides of the central portion.

* * * * *